Oct. 26, 1965   N. D. HAUGEN ETAL   3,213,569
APPARATUS FOR GRINDING AND POLISHING OPTICAL LENS
Filed June 13, 1962   2 Sheets-Sheet 1
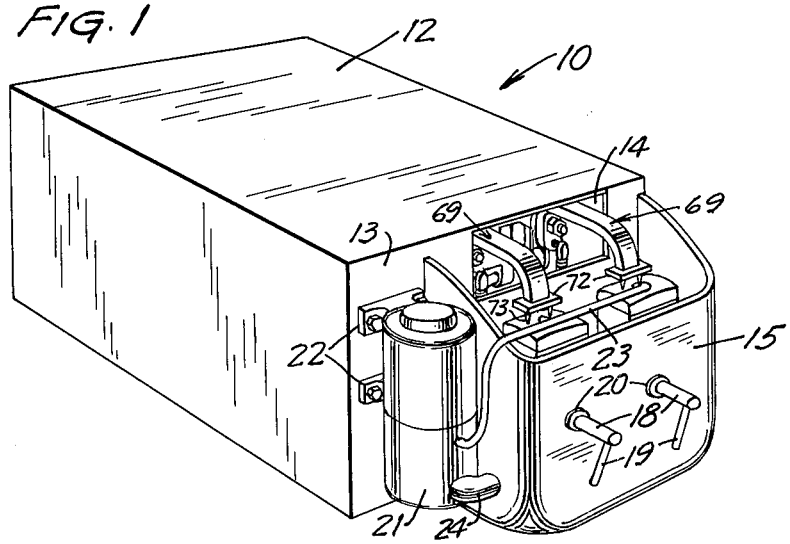
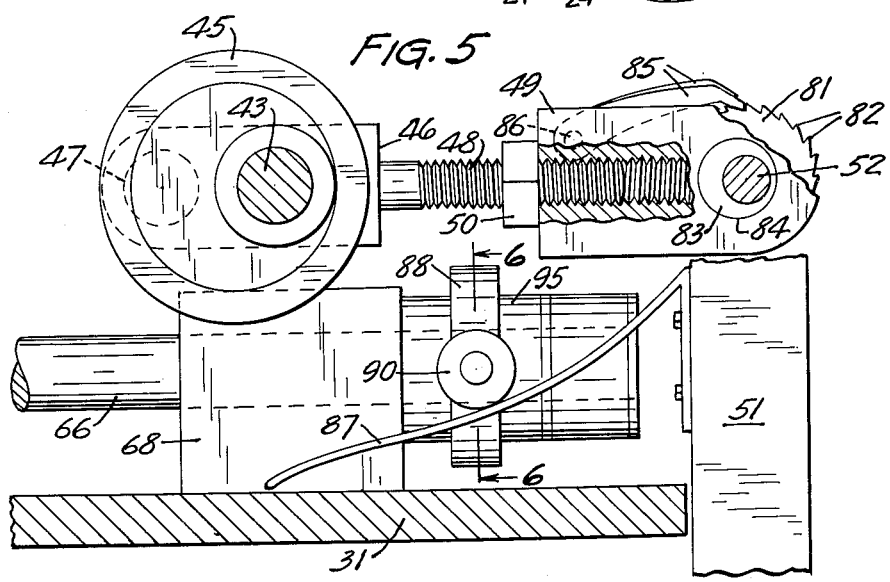
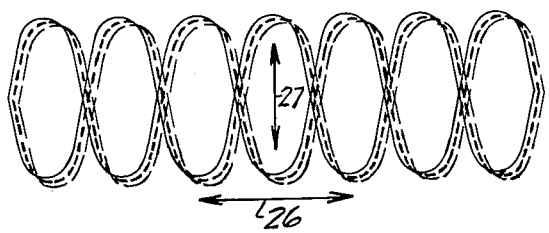
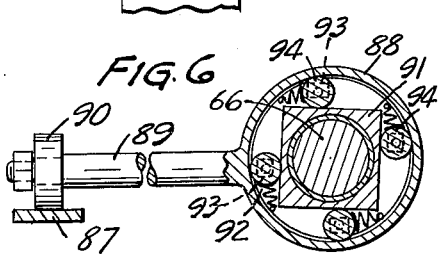
INVENTORS
NORMAN D. HAUGEN
ALBERT L. ANDERSON
BY Williamson & Palmatier
ATTORNEYS

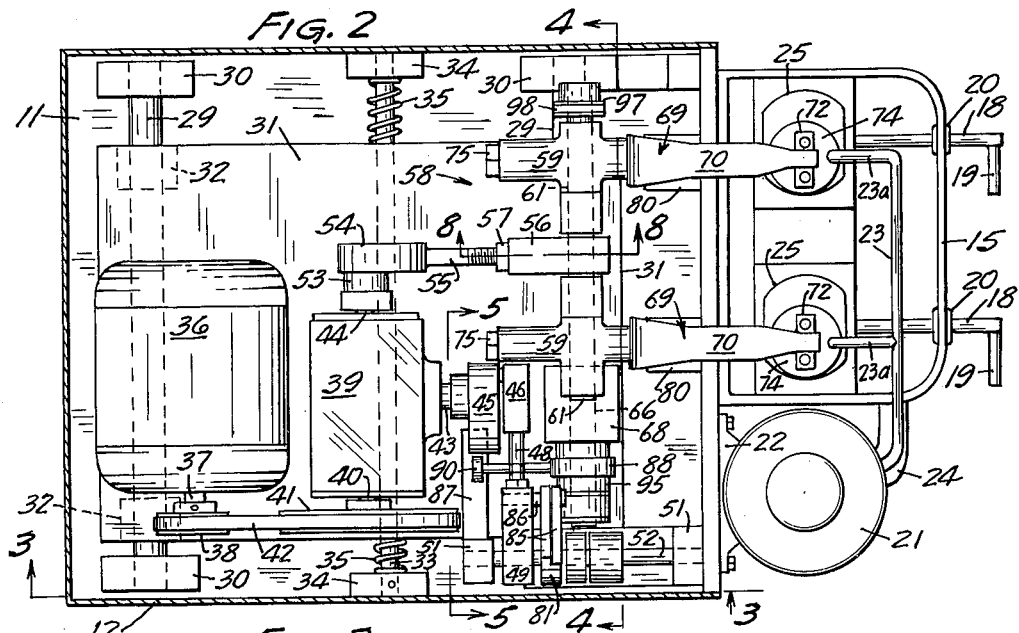

United States Patent Office 3,213,569
Patented Oct. 26, 1965

3,213,569
APPARATUS FOR GRINDING AND POLISHING OPTICAL LENS
Norman D. Haugen and Albert L. Anderson, Minneapolis, Minn., assignors to N. P. Benson Optical Company, Minneapolis, Minn., a corporation of Minnesota
Filed June 13, 1962, Ser. No. 202,272
2 Claims. (Cl. 51—160)

This invention relates to apparatus for use in grinding and polishing optical lens.

In the art of manufacturing optical lens, especially those of the type used in eye glasses, the optical surfaces of the lens must be ground and polished to a highly smooth finish. In polishing and grinding the optical surface of such an optical lens, the lens is positioned against the compoundly curved grinding surface of a tool lap and relative movement is produced between the lens and tool lap while simultaneously applying an abrasive material between the respective contacting surfaces of the lens of a grinding surface.

In many conventional machines, the lens is continuously reciprocated over the curved grinding surface and describes an endless sinuous path of movement. In this connection, it is pointed out that the curves of the grinding surface of a tool lap are arranged in transverse relation and one of these curves corresponds to the base curve of the lens while the other curve corresponds to the cross curve of the lens. It has been found that if the lens retraces its path of movement over the tool lap, irregularities in the optical surface of the lens may be produced. If irregularities are formed on the optical surface of the lens, then the lens must, of course, be reground and polished.

Provision is made in many of the conventional machines to slightly change the sinuous path of movement to avoid the retracing and the attendant production of irregularities in the lens. However, because of the inherent construction of these machines, the change in the position of the strokes of the lens is accomplished in a random fashion so that retracing of the path of movement may occur.

Therefore, a general object of this invention is to provide a novel apparatus for grinding and polishing optical lens wherein the lens are reciprocated over a compoundly curved surfacing tool lap in an endless sinuous path of movement, and in which the position of each succeeding stroke of the lens is positively and uniformly shifted to thereby prevent retracing of the lens whereby the occurrence of irregularities in the lens surface is greatly reduced if not eliminated.

Another object of this invention is to provide a novel apparatus for grinding and polishing optical lens in which the lens is reciprocated over the compoundly curved surfacing tool lap simultaneously in the direction of the base curve and cross curve of the tool lap grinding surface, and in which the position of each succeeding stroke of the lens is shifted uniformly in both the base curve and cross curve directions.

A further object of this invention is to provide a novel and improved lens grinding and polishing apparatus of simple, inexpensive, and compact construction, having a carriage upon which is positioned drive means and the cross-curve motion producing mechanism, and wherein the carriage is slidably mounted for reciprocating movement to produce the base curve motion of the lens being surfaced.

Another object of this invention is to provide a lens surfacing apparatus of the class described including a carriage mounted for reciprocating movement in a direction reciprocating a lens to be surfaced over the base curve of a compoundly curved surfacing tool lap, and wherein the cross-curve motion producing mechanism is mounted on the carriage along with the drive means for the apparatus to thereby permit the use of a single but highly effective drive means for driving both the carriage and cross-curve motion producing mechanism.

A further object of this invention is to provide a novel and improved surfacing apparatus of the class described including means for reciprocating lens over a compoundly curved surfacing tool lap simultaneously in the base curve and cross curve directions, and including means for positively and uniformly shifting the position of both the base curve and cross curve stroke during terminal portion of the base curve return stroke of the lens.

These and other objects and advantages of this invention will more fully appear from the following description made in connection with the accompanying drawing wherein like character references refer to the same or similar parts throughout the various views, and in which:

FIG. 1 is a front perspective view of the lens surfacing apparatus;

FIG. 2 is a top plan view of the apparatus with the top curve of the housing removed therefrom;

FIG. 3 is a longitudinal sectional view taken approximately along line 3—3 of FIG. 2 looking in the direction of the arrows;

FIG. 4 is a transverse cross sectional view taken approximately along line 4—4 of FIG. 2 and looking in the direction of the arrows;

FIG. 5 is a cross sectional view on an enlarged scale taken approximately along line 5—5 of FIG. 2 and looking in the direction of the arrows and with certain concealed parts thereof illustrated by dotted line configuration;

FIG. 6 is vertical cross sectional view taken approximately along line 6—6 of FIG. 5 and looking in the direction of the arrows;

FIG. 7 is a diagrammatic plan view illustrating the path of movement of the surface of the tool lap of a lens during the grinding and polishing operation; and FIG. 8 is a cross sectional view on an enlarged scale taken approximately along line 8—8 of FIG. 2 and looking in the direction of the arrows.

Referring now to the drawing and more particularly to FIG. 1, it will be seen that one embodiment of the lens grinding and polishing apparatus, designated generally by the reference numeral 10 is there shown. This apparatus 10 is of compact construction and is so arranged and constructed that a highly efficient method of grinding and polishing a surface of an optical lens may be effectively accomplished. The lens grinding and polishing apparatus 10 includes a support base 11 which is constructed of a suitable metallic material and which is of generally rectangular configuration. A housing 12 is detachably secured to the support base 11 and the housing 12 serves to close many of the components of the apparatus. The housing may also be constructed of a suitable metallic material and it will be noted that the front wall thereof is of heavier construction than the remaining housing wall. It will also be noted that the front wall 13 of the housing is provided with a pair of spaced apart openings 14 therein the function of which will be described hereinbelow.

Affixed to the front wall 13 which also serves as a mounting plate and projecting forwardly therefrom is a receptacle 15 which is in the form of an open top bowl as best seen in FIG. 1. The bowl type receptacle 15 serves to receive the fluid abrasive material therein during the surfacing operation. Mounted in upstanding relation within the receptacle 15 is a pair of tool lap supports 16 each of which includes releasable clamping jaws 17 carried by the respective upper portions thereof. The clamping jaws 17 of each tool lap support 16 releasably mount a compoundly curved surfacing tool lap thereon. The jaws 17 of each tool lap support are moved into and out of clamping relation with respect to the tool lap by means of an elongate actuating handle 18 having an offset hand gripping portion 19 as best seen in FIGS. 1 and 3. The elongate revolvable handle 18 of the tool lap supports project through a suitable seal bearing 20 mounted in the outermost wall of the receptacle 15. The particular construction of the tool lap support clamping jaws thereof is that of those conventionally used in the lens surfacing art and a detailed description thereof is felt to be unnecessary for the instant invention. Further, the actuation of the clamping jaws 17 is accomplished by revolving the handle 18 in a well known manner. To this end it is pointed out that the tool lap support 16 and clamping jaws 17 thereof are of the type which are fixed or immovable during the operation of the surfacing apparatus and are similar to those which are now commercially available manufactured by Bausch & Lomb and the Coburn Manufacturing Company and others.

Means are provided for continuously supplying a fluid abrasive to a tool lap mounted on the tool lap support 16 during the surfacing operation of the apparatus 10 and this means includes a conventional motor and pump unit 21 secured to the front wall 13 of the housing 12 by means of a mounting bracket 22. It will be noted that the motor and pump unit 21 is mounted in close proximity to the receptacle 15 and is provided with a discharge conduit 23 including a plurality of branches 23a for supplying the fluid abrasive material to the surfaces of the tool laps upon which the lens to be ground are being moved. The motor and pump unit 21 also include an inlet conduit 24 which is arranged in communicating relation with the lower portion of the receptacle 15 so that the fluid abrasive accumulating therein will be caused to flow back through the pump and motor unit 21 by a suction action.

The tool lap which is clamped by the clamping jaw 17 of the tool lap support 16 is designated generally by the reference numeral 25 and it will be seen that this tool lap has a grinding surface comprised of a base curve 26 and a cross curve 27, the latter being arranged in right angular transverse relation with respect to the base curve. The base curve 26 corresponds to the base curve of the lens to be ground and the cross curve accordingly corresponds to the cross curve of the lens to be ground. In most cases the radius of the base curve is different from that of the cross curve so that the grinding surface of a tool lap does not define a section of the sphere. The particular curve selected will be dependent upon the optical correction to be formed in the lens.

The tool lap 25 also includes a reduced lower clamp engaging portion 28 which is of rectangular configuration and which is clamped between the clamping jaw 17 of the tool lap support 16. It is also pointed out that the grinding surface of the tool lap is scored or provided with spaced-apart grooves extending in the direction of a cross curve of the grinding surface and which serves to permit the liquid abrasive material to be evenly distributed over the grinding surface of the tool lap. The various other components comprising the inventive apparatus will be described hereinbelow under separate headings for clarity.

*Carriage structure*

Referring now to FIGS. 2, 3 and 4, it will be seen that the support base 11 is provided with a pair of spaced apart substantially parallel elongate, carriage slide rods 29, each being rigidly mounted on the support base by means of a pair of support blocks 30. These carriage slide rods 29 are of circular cross sectional configuration and are positioned adjacent opposite edges of the support base 11. Slidably mounted on the slide rods 29 for reciprocating movement in a direction corresponding to the base curve of the tool lap is a carriage 31. This carriage 31 is formed of a suitable metallic material and is of substantially rectangular configuration. The carriage 31 is mounted for sliding movement on the carriage slide rods 29 by means of slide bearings 32, each being affixed to the underside of the carriage and being arranged in aligned pairs.

The support base 11 also has mounted thereon an elongate spring mounting rod 33 positioned between and substantially parallel to the carriage slide rods 29. Opposite ends of the spring mounting rod 33 are secured to mounting blocks 34, the latter being fixedly attached to the support base 11. Telescopically positioned upon the spring mounting rods 33 are a pair of coil springs 35 each having one end disposed in bearing engagement with one of the support blocks 34 and having their respective other ends engaging a bearing element 31a affixed to the underside of the carriage 31. These springs 35 serve to cushion the movement of the carriage as the latter is reciprocated and also serves to assist in the return of the carriage in the opposite direction. Thus it will be seen that the carriage is mounted for reciprocating sliding movement relative to the support base upon which it is mounted.

*Drive means*

A very simple, but highly effective drive means is provided for driving the mechanism employed to produce movement of the lens in both the base curve and cross curve directions of the tool lap. The drive means includes an electric motor 36 of conventional construction and having a drive shaft 37 to which is affixed a small drive pulley 38 for movement therewith. It will be noted that the electric motor 36 is detachably mounted upon the carriage 31 by conventional bolts or the like. A gear box unit 39 is also mounted on the carriage 31 in close proximity to the motor and this gear box unit is provided with a driven input shaft having a relatively large driven pulley affixed thereto for rotation therewith. A drive belt 42 is trained over the drive pulley 38 and the driven pulley 41 whereby upon rotation of the drive shaft 37 the driven input shaft 40 of the gear box will be driven. Although the gear box unit 39 is provided with the conventional gear reducing elements therein the relative sizes of the drive pulley 38 and the drive pulley 41 also produces a speed reducing effect.

The gear box unit 39 is provided with a pair of output drive shafts and one of these drive shafts 43 has driving connections with means for reciprocating the carriage 31 which motion reciprocates the lens to be polished in a base curve direction over the tool lap. The other output shaft 44 of the gear box unit 39 has driving connection with a means for producing the cross curve motion of the lens as the latter is moved over the grinding surface of the tool lap.

*Carriage shifting mechanism*

Referring now to FIG. 5, it will be seen that the gear box output shaft 43 is connected to a circular crank member 45 in eccentric relation therewith. An elongate crank arm 46 is eccentrically connected as at 47 on the outer side of the circular crank member 45 so that upon revolving movement of the output shaft 43, the crank arm 46 will be caused to reciprocate. The crank arm 46 includes a reduced threaded portion 48 which is threadedly received in a threaded bore of the crank arm bearing block portion 49. It will, therefore, be seen that the length of the crank arm 46 is adjustable longitudinally and it will also be noted that the crank arm bearing block portion 49 is retained in an adjusted position by a lock nut 50.

The support base 11 has a pair of spaced apart pivot rod support members 51 secured thereto in upstanding relation therewith. An elongate pivot rod extends between and is fixedly connected to the support members 51 as best seen in FIG. 2. The crank arm bearing block portion 49 is pivotally interconnected with the pivot rod 52 whereby upon reciprocating movement of the crank arm 46, the carriage 31 will be reciprocated in a direction corresponding to the base curve of the tool lap.

*Drive transmitting means for the cross curve motion-producing mechanism*

The output shaft 44 of the gear box 39 is also eccentrically connected to a circular crank member 53 for revolving movement therewith. An elongate crank arm 54 has one end thereof connected to the circular crank member 53 in eccentric relation therewith so that the crank arm 54 is reciprocated as the output 44 is revolved. A crank arm 54 also has a threaded reduced end portion 55 which is threadedly received within a threaded bore of the crank arm bearing block portion 56. It will, therefore, be seen that the crank arm 54 may be slightly longitudinally adjusted by adjustment of the bearing block portion 56 relative to the threaded portion 55 of the crank arm. A lock nut 57 retains the bearing block portion 56 in an adjusted position. The crank arm bearing block portion 56 is provided with a suitable bore extending transversely therethrough to permit the arm to be operatively connected with the cross curve motion-producing mechanism designated generally by the reference numeral 58.

Thus it will be seen that the reciprocation of the crank arm 54 causes reciprocating movement of the cross motion producing mechanism in the direction of the cross curve of the tool lap.

*Cross curve motion producing mechanism*

The cross curve motion producing mechanism 58 is in the form of a rocker arm structure and this rocker arm structure includes a pair of substantially identical rocker arm members 59. Each of the rocker arm members 59 which are of tubular construction is provided with a pair of depending legs 60 suitably apertured to receive an elongate shaft 61 therethrough. The legs 60 pivotally engage the shaft 61 which is of substantially circular cross sectional configuration as best seen in FIG. 3. It will also be noted that the rocker arm bearing block portion 56 is also drivingly interconnected with the pivot shaft 61.

The rocker arm structure also includes an H-shape member 62 which includes a transverse portion 63 rigidly interconnecting a pair of vertically disposed legs 64. These legs 64 are each provided with a bore 65 in the lower portion thereof for receiving an elongate shaft 66 therethrough. The legs 64 engage the shaft 66 which is of circular cross sectional configuration for free pivotal movement relative thereto. The upper portions of the legs 64 are also provided with suitable bores 67 therein for receiving the shaft 61 therethrough.

The upper portions of the legs 64 of the H-shaped member are provided with axially aligned bores 67 therein for receiving the shaft 61 therethrough. Suitable bearings are interposed between the bores and the shaft 61 to permit the H-shaped member to pivot freely with respect to the shaft.

A pair of spaced apart shaft support blocks 68 are rigidly attached to the carriage 31 and these shaft support blocks are provided with axially aligned bores for receiving opposite ends of the lower shaft 66 therethrough. Thus it will be seen that the rocker arm structure is mounted upon the carriage 31 for movement therewith with a base curve direction. It will also be noted that the reciprocation of the crank arm 54 causes reciprocating movement of the rocker arm structure relative to the carriage 31 in a direction corresponding to the cross curve of the tool lap.

*Lens holder mechanism*

Means are provided for holding the lens to be ground in contacting relation with the tool lap during operation of the lens grinding apparatus. This means includes a pair of lens holder mechanisms each being associated with one of the locker arm members 59 in operative relation therewith. Each of these lens holder mechanisms includes an elongate U-shaped lens holder arm 69 having a pair of depending legs 71 integrally formed therewith. The lower end of the forwardmost leg 71 of each of the lens holder arms is provided with a substantially flat pin bearing member 72, the latter having a plurality of depending stylus pins 73 affixed thereto. These stylus pins project into apertures formed in the upper surface of a conventional lens holder in the conventional manner, as best illustrated in FIGS. 2 and 3. It should be pointed out that the lens holder 74 is of conventional construction and that the lens to be ground may be detachably secured thereto by any suitable conventional cementitious material such as pitch which is rendered brittle and readily breakable when chilled.

Referring again to FIG. 3 it will be seen that the pair of legs 71 of each of the lens holder arms 69 is releasably clamped with its associated rocker arm member 59. To this end, each of the tubular rocker arm members 59 has a headed bolt 75 extending therethrough. The rear leg 71 of each lens holder arm are also suitably apertured to receive the bolt 75 therethrough and a nut 76 clamps the lens holder arm to its associated rocker arm member.

Inasmuch as the rocker arm members 59 are freely pivotable about the shaft 61, means are provided for urging the rocker arm downwardly and forwardly to correspondingly urge the lens supported by the lens holder arm into bearing engagement with the grinding surface of the tool lap 25. This means includes a small clip or bracket 77 which is secured to the lower end of the rearmost leg of each lens holder arm 69. This small bracket 77 has an aperture therein for receiving the upper end of a coil spring 78 therethrough and the lower end of the spring 78 is releasably connected to an eye bolt 79, the latter being detachably connected to a bracket 80 affixed to the lower inner surface of the front wall 13 of housing 12. It will be seen that the tension of spring 78 may be varied by adjustment of the eye bolt 79 relative to the bracket 80. It will also be seen that the coil spring 78 tends to urge its associated rocker arm member 59 about the shaft 61 whereby the lens to be ground is maintained in engaging relation with respect to the grinding surface of the tool lap 25.

*Carriage stroke-shifting mechanism*

When the apparatus is in operation, the carriage will be reciprocated in the direction of the base curve of a tool lap and the cross-curve motion producing mechanism 58 will be simultaneously reciprocated during movement of the carriage. The lens to be ground will be moved in an endless sinuous path over the grinding surface of a tool lap as the abrasive material is applied to the tool lap grinding surface. However, if the lens is moved over the same sinous path during this grinding operation irregularities will be produced on the finished surface of the lens. Many of the conventional machines have made provision for random shifting of the paths of movement of the lens during the grinding operation but none of these machines are able to positively uniformly control the shifting of the strokes of the lens in both the base curve and cross curve directions.

Means are therefore provided for uniformly shifting the position of each succeeding stroke of the carriage in the base curve direction continuously during the grinding operation.

Referring again to FIGS. 2, 3 and 5, it will be seen that a ratchet wheel 81 is mounted on the pivot rod 52. This ratchet wheel 81 is provided with a plurality of teeth 82 and is mounted in coaxial relation with respect to the pivot rod 52. Integrally formed with the ratchet wheel 81 and projecting axially from one side thereof is a circular cam member 83, the latter having an eccentric bore 84 therethrough as best seen in FIG. 5. The ratchet wheel 81 and cam associated therewith engage the pivot rod in snug fitting relation and are not freely rotatable thereon but it is pointed out that the ratchet wheel and cam member may be forcibly rotated with respect to the pivot rod 52.

The cam member 83 is received within a bore formed in the bearing block portion 49 of the crank arm 46. It will, therefore, be seen that the external surface of the cam member 83 constitutes the pivot connection for the crank arm 46. Inasmuch as the bore of the cam member 83 is eccentrically arranged with respect to the pivot rod 52, revolving movement of the cam member 83 effectively changes the position of the pivot for the crank arm 46.

Means are provided for revolving the ratchet wheel 81 and cam member 83 relative to the pivot rod 52 during the terminal portion of each return stroke of the carriage 31. This means includes a pair of pawls 85 arranged in side-by-side relation and being secured to the crank arm bearing block portion 49 by a pin 86. It will be seen that one of the pawls is longer than the other pawl and the differences in lengths of pawls correspond substantially to half the distance between the pawl-engaging surfaces of adjacent teeth.

With this arrangement, only one of the pawls engages the pawl-engaging surface of a tooth to move the ratchet wheel and to thereby shift the cam member 83 relative to the pivot rod 52 during each forward stroke and return thereof. During this operation, the carriage 31 will be moved in a base curve direction away from the ratchet wheel 81 during the forward strokes thereof and upon return of the carriage, the pawl 85 which is in engagement with the pawl-engaging surface of one of the teeth 82 will forcibly turn the ratchet wheel during the terminal portion of the return stroke to rotate the cam member slightly relative to the pivot rod 52. As the ratchet wheel moves, the other pawl is then moved into engaging relation with the next adjacent tooth while the first pawl member will be positioned substantially half way between the respective pawl engaging surfaces of adjacent teeth. Thus, the effective pivot point of the crank arm 46 is changed automatically and uniformly during the terminal portion of the return stroke of the carriage.

*Stroke shifting mechanism for the cross-curve motion producing mechanism*

Means are also provided for uniformly and automatically shifting the position of the cross curve motion producing mechanism so that the movement of the lens in a cross curve direction over the tool lap will be shifted during the terminal portion of the return stroke of the carriage. This stroke shifting mechanism for shifting the stroke of the cross-curve motion producing mechanism includes an inclined track 87 positioned below the crank arm 46 as best seen in FIG. 5. It will be seen that the track 87 has its uppermost end connected in fixed relation with respect to the base 11 through one of the side walls of the housing. The lower end of the track extends downwardly toward the carriage 31 and is left undetached to thereby permit relative movement between the carriage 31 and the track. It will also be seen that the track 87 is positioned in close proximity to the terminal portion of the lower shaft 66. Referring now to FIG. 6, it will be seen that the shaft 66 has a cylindrical housing 88 positioned in concentric relation therearound. The housing 88 has an arm 89 affixed thereto and projecting outwardly therefrom and a roller 90 is journaled for rotation to the end of the arm 89. It will be noted that the roller 90 is positioned upon the track 87 for movement therealong during reciprocating movement of the carriage 31.

Positioned within the housing 88 is a roller bearing block 91, the latter having a cylindrical bore therein for receiving the shaft 66 therethrough. It is pointed out that the bearing block 91 is keyed to the shaft 66 for rotation therewith. It will be noted that the bearing block 91 is of rectangular cross sectional configuration and has a plurality of planar roller bearing surfaces defined thereby. Affixed to opposite ends of the bearing block 91 are end flanges 92 which project outwardly therefrom. These end flanges have slots 93 formed therein which are arranged in opposed pairs for receiving the ends of rollers 94 therethrough. It will be seen that these slots 93 are circumferentially arranged and each is of elongate configuration to permit relative movement of the rollers along the planar surfaces of the bearing block 91. It will also be noted that the end flanges are not substantially circular so that the planar surfaces of the bearing member 91 do not constitute true chords of a circle. Therefore, as the rollers 94 roll along the planar surfaces of the bearing member 91 in one direction, the rollers will be urged into wedged engagement with the housing so that the housing and bearing block 91 revolve as a unit. However, movement in the opposite direction of the rollers along the planar surfaces permits relative movement of the bearing block and the housing.

It will therefore be seen that as the roller 90 moves upwardly along the track 87, the rollers 94 will be urged into wedged relation with respect to the housing 88 so that annular movement of the arm is transmitted to the shaft 66 to rotate the same in a clockwise direction as viewed in FIG. 6. As the roller 90 moves downwardly along the track, the housing 88 will rotate relative to the bearing block 91 and this movement occurs during the forward stroke of the carriage 31. This housing and roller bearing block member are of conventional construction and serve to permit movement of the shaft 66 in one direction while permitting relative movement between the shaft and the housing in the opposite direction. In order to positively prevent return of the shaft as the roller 90 moves downwardly the track a similar unit 95 is also mounted on the shaft 66. It is pointed out that this unit 95 is of identical construction to the unit illustrated in FIG. 6 except the wedging action between the roller and the housing are oppositely arranged. With this arrangement, the shaft 66 is revolved in only one direction and is prevented from return in the opposite direction by the unit 95.

Referring now to FIG. 4, it will be seen that the opposite end of the lower shaft 66 has a small pulley 96 affixed thereto for rotation therewith. It will also be seen that the corresponding end of the upper shaft 61 also has a pulley 97 keyed thereto for rotation therewith. An endless belt 98 is trained around the pulleys 96 and 97 for transmitting angular motion of the shaft 66 to the shaft 61.

Referring now to FIG. 8, it will be seen that the upper shaft 61 has a circular cam 99 keyed thereto for rotation therewith. This circular cam 99 has an eccentrically arranged bore 100 formed therein, the bore receiving the shaft 61 therethrough. The cam member 99 is received within the bore 101 of the bearing block portion 56 of crank arm 54. Thus, the outer circumferential surface of the cam 99 constitutes a pivot surface for the crank arm 54. It will, therefore, be seen that as the upper shaft 61 is revolved by the lower shaft 66 acting through the belt pulley drive, the circular cam 99 will also be revolved thereby effectively changing the position of the pivot connection between the shaft 61 and the crank arm 54. With this arrangement, the position of the stroke in a cross curve direction may be uniformly and automatically changed during operation of the appartus. Thus it will be seen that not only is the position of the stroke of the lens in a base curve direction uniformly and automatically changed but that the position of the stroke in a cross curve direction is also uniformly and automatically changed.

*Operation*

To prepare the lens polishing and grinding appartus 10 for operation, the lens holder mechanism may be tilted rearwardly to permit a lens holder 74 to be secured to the stylus pins thereof. The lens to be ground will be secured to the lens holder by means of a pitch type adhesive material which securely holds the lens to the lens holder but which becomes very brittle and frangible upon chilling.

A suitable tool lap 25 will be positioned in each of the tool lap holders. The lens holder mechanism will be moved downwardly to position the lens to be ground into engaging relation with the respective grinding surfaces of the tool lap. The spring 78 will serve to urge the lens holder downwardly so that the proper contacting relation between the lens and the tool lap will be maintained. The motor pump unit 21 will be energized to permit a suitable liquid abrasive to be applied to the grinding surface of a tool lap and the electric motor 36 will thereafter be energized. The channels or scores on the grinding surface of the tool lap permit the abrasive material to be disseminated thoroughly over the grinding surface of the tool lap.

When the motor 36 is energized, the output shafts 43 and 44 will be simultaneously revolved at a predetermined desired speed. As the output shaft 43 is revolved, the crank arm 54 will be reciprocated to move the carriage 31 through a forward stroke in the base curve direction. The carriage during the forward stroke in the base curve direction moves in a direction away from the ratchet wheel 81 thus causing the lens to be ground to be correspondingly moved in a base curve direction. One of the spring elements 25 cushions the carriage at the end of the forward stroke in a base curve direction and also serves to assist return of the carriage in the base curve direction.

Simultaneously during movement of the lens to be ground in a base curve direction over the tool lap grinding surface, the rocker arm structure will be driven by crank arm 54 to move the lens through a forward stroke in the cross curve direction and continued reciprocating movement of the crank arm 54 causes the lens to be returned in a cross curve direction. Referring now to FIG. 7, it will be seen that the lens to be ground is moved through a forward stroke in the cross curve direction during one forward stroke and return thereof of the lens in the base curve direction.

During the terminal portion of the return stroke of the lens in a base curve direction, one of the pawls 85 will revolve the ratchet wheel 81 and the cam member 83 relative to the pivot rod 52. This action effectively changes the position of the forward and return stroke of the carriage in a base curve direction which is clearly illustrated in FIG. 7. Simultaneously during the terminal portion of the return stroke of the carriage, the roller 90 will roll upwardly upon the track 87 thereby causing the lower shaft 66 to revolve slightly. This angular movement of the lower shaft 66 is transferred through the belt and pulley drive to the upper shaft 61 which is correspondingly revolved. As shaft 61 revolves, the cam which is engaged by the rocker arm 46 will be slightly shifted thereby effectively changing the position of the cross curve stroke. The succeeding sinuous path of movement of the lens will not retrace the preceding path of movement thereof and this overlapping relation of the sinuous paths of movement may be readily noted in the pattern illustrated in FIG. 7. Thus it will be seen that the lens is absolutely controlled against retracing its pattern of movement throughout the grinding and polishing operation. Therefore, the occurrence of irregularities in the lens surface is greatly reduced if not eliminated by the control repositioning of the cross curve and base curve strokes.

It will also be noted that most of the component parts of the lens polishing and grinding apparatus are mounted upon the carriage thereby permitting the entire apparatus to be of compact construction. By utilizing the carriage itself to produce the base curve motion, a single drive means may be employed thus eliminating many of the parts found in most conventional grinding and lens polishing apparatus.

From the foregoing, it will be seen that there has been provided a novel apparatus for use in grinding and polishing optical lens and wherein the patterns of movement of the lens over the tool lap grinding surface are positively controlled to prevent any retracing of paths of movement of the lens.

What is claimed is:

1. Apparatus for use in grinding and polishing optical lens, said apparatus comprising, a support base, a tool lap support mounted on said support base for supporting a tool lap of the type having a compoundly curved, grinding surface wherein the curved surfaces thereof are arranged in transverse relation and one of which corresponds to the base curve of the lens and the other curve corresponding with the cross curve of a lens to be ground, carriage structure shiftably mounted on said support base for reciprocating movement relative thereto through a forward stroke and return and in a direction corresponding to the base curve of a tool lap mounted on said tool lap support, rocker arm mechanism shiftably mounted on said carriage for reciprocating movement relative thereto through a forward stroke and return transversely of the direction of movement of the carriage and in a direction corresponding with the cross curve of a tool lap mounted on said tool lap support, lens holder structure for holding a lens to be ground in sliding engagement with the tool lap and being connected with said rocker arm mechanism for movement therewith, drive means mounted on said carriage and having a reciprocating drive transmitting member pivotally connected with said support base and being operable to reciprocate the carriage in the base curve direction, said drive means having a second reciprocating drive transmitting member pivotally connected with said rocker arm mechanism for reciprocating said mechanism through a predetermined number of forward and return strokes in the cross curve direction simultaneously during one forward stroke and return of the carriage in the base curve direction whereby a lens mounted on said lens holder will be moved in an endless, sinous path over the grinding surface of a tool lap, carriage stroke-shifting mechanism including cam means pivotally mounted on said support base and comprising the pivotal connection between said first mentioned drive transmitting member and the support base, means for shifting said cam means during the terminal portion of the return stroke of the carriage to thereby uniformly shift the position of successive forward and return strokes of the carriage in the base curve direction, said means for shifting said cam means comprising cooperating ratchet and pawl elements, one of which is mounted on said first mentioned drive transmitting member and the other of which is affixed to said cam means, rocker arm stroke-shifting mechanism including cam means shiftably mounted on said carriage and comprising the pivotal connection between said second drive transmitting member and said rocker arm mechanism, and means for shifting said second mentioned cam means during the terminal portion of the return stroke of the carriage to thereby uniformly shift the position of the forward and return strokes of the rocker arm mechanism in the cross curve direction.

2. Apparatus for use in grinding and polishing optical lens, said apparatus comprising:

a support base, a tool lap support mounted on said support base for supporting a tool lap of the type having a compoundly curved, grinding surface wherein the curved surfaces thereof are arranged in transverse relation and one of which corresponds to the base curve of the lens and the other curve corresponding with the cross-curve of the lens to be ground, a carriage structure shiftably mounted on said support base for reciprocating movement relative thereto through a forward stroke and return and in a direction corresponding to the base curve of a tool lap mounted on said tool lap support, rocker arm mechanism shiftably mounted on said carriage for reciprocating movement relative thereto through a forward stroke and return transversely of the direction of movement of the carriage and in a direction corresponding with the cross-curve of a tool lap mounted on said tool lap support, lens holder structure for holding a lens to be ground in sliding engagement with the tool lap and being connected with said rocker arm mechanism for movement therewith, drive means mounted on said carriage and having a reciprocating drive transmitting member pivotally connected with said support base and being operable to reciprocate the carriage in the base curve direction, said drive means having a second reciprocating drive transmitting member pivotally connected with said rocker arm mechanism for reciprocating said mechanism through a predetermined number of forward and return strokes in the cross-curve direction simultaneously during one forward stroke and return of the carriage in the base curve direction whereby a lens mounted on said lens holder will be moved in an endless sinous path over the grinding surface of a tool lap, carriage stroke-shifting mechanism including cam means pivotally mounted on said support base and comprising the pivotal connection between said first mentioned drive transmitting member and the support base, means for shifting said cam means during the terminal portion of the return stroke of the carriage to thereby uniformly shift the position of successive forward and return strokes of the carriage in the base curve direction, rocker arm stroke-shifting mechanism including cam means shiftably mounted on said carriage and comprising the pivotal connection between said second drive transmitting member and said rocker arm mechanism, means for shifting said second mentioned cam means during the terminal portion of the return stroke of the carriage to thereby uniformly shift the position of the forward and return strokes of the rocker arm mechanism in the cross-curve direction, said means for shifting said second mentioned cam means comprising an inclined track element and a track-engaging roller element mounted for movement along said track element, one of said elements being mounted on said support base and the other of said elements mounted on said carriage.

References Cited by the Examiner
UNITED STATES PATENTS

| | | | |
|---|---|---|---|
| 1,709,943 | 4/29 | Long | 51—160 |
| 2,159,620 | 5/39 | Long | 51—160 |
| 2,192,486 | 3/40 | Lockhart | 51—160 |
| 2,826,874 | 3/58 | Katzenberg | 51—160 |
| 2,847,804 | 8/58 | Calkins et al. | 51—284 |
| 2,990,664 | 7/61 | Cepero | 51—284 |

LESTER M. SWINGLE, *Primary Examiner.*

JOHN C. CHRISTIE, *Examiner.*